United States Patent
Hermann et al.

(10) Patent No.: US 9,133,333 B2
(45) Date of Patent: Sep. 15, 2015

(54) BLEND OF A GRAFT COPOLYMER AND A SECOND POLYMER MISCIBLE WITH SIDECHAINS OF THE GRAFT COPOLYMER

(71) Applicant: THE GOODYEAR TIRE & RUBBER COMPANY, Akron, OH (US)

(72) Inventors: Alexandra Hermann, Mainz (DE); Robert Fokko Roskamp, Trier (DE); Ralf Mruk, Lipperscheid (LU); Liqing Ma, Fairlawn, OH (US); Frank James Feher, Copley, OH (US); Rudolf Wilhelm Zentel, Nierstein (DE); Bruce Raymond Hahn, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 226 days.

(21) Appl. No.: 13/686,051

(22) Filed: Nov. 27, 2012

(65) Prior Publication Data

US 2014/0148551 A1   May 29, 2014

(51) Int. Cl.
  *C08L 51/04* (2006.01)
  *B60C 1/00* (2006.01)
  *C08C 19/22* (2006.01)

(52) U.S. Cl.
  CPC . *C08L 51/04* (2013.01); *B60C 1/00* (2013.01); *B60C 1/0016* (2013.04); *C08C 19/22* (2013.01); *C08F 2438/03* (2013.01)

(58) Field of Classification Search
  USPC ...................................... 525/72, 86
  See application file for complete search history.

(56) References Cited

U.S. PATENT DOCUMENTS

| | | | |
|---|---|---|---|
| 4,755,564 A | 7/1988 | Lindner et al. | |
| 4,937,290 A | 6/1990 | Bauer et al. | |
| 6,486,213 B1 | 11/2002 | Chen et al. | |
| 7,166,665 B2 | 1/2007 | Galimberti et al. | |
| 7,671,128 B1 | 3/2010 | Thielen et al. | |
| 7,671,152 B2 | 3/2010 | Parker et al. | |
| 7,847,019 B2 | 12/2010 | David et al. | |
| 7,883,692 B2 | 2/2011 | L'Alloret | |
| 8,883,884 B2 * | 11/2014 | Ma et al. | 523/522 |
| 2008/0234391 A1 | 9/2008 | McCormick et al. | |
| 2010/0036043 A1 * | 2/2010 | Weber et al. | 524/504 |
| 2013/0165587 A1 * | 6/2013 | Mruk et al. | 525/218 |

FOREIGN PATENT DOCUMENTS

| | | |
|---|---|---|
| EP | 0583814 A1 | 2/1994 |
| EP | 0629649 A1 | 12/1994 |
| EP | 1801137 A1 | 6/2007 |
| EP | 1801158 A1 | 6/2007 |
| EP | 2607101 A1 | 6/2013 |
| EP | 2607102 A1 | 6/2013 |
| EP | 2610295 A1 | 7/2013 |
| GB | 785631 | 10/1957 |
| JP | 60188411 A | 9/1985 |

OTHER PUBLICATIONS

Non-Final Office Action dated Mar. 19, 2013, U.S. Appl. No. 13/332,535.
Pierre-Eric Millard et al, RAFT Polymerization of N-Isopropylacrylamide and Acrylic Acid under g-Irradiation in Aqueous Media, Macromolecular: Rapid Communications, Jan. 1, 2006, 821-828, vol. 27, DE.
Wen-Fu Lee et al, Graft Copolymerization of N-Isopropylacrylannide on Styrene-Butadiene-Styrene Block Copolymer, Journal of Applied Polymer Science, Dec. 9, 2001, 2641-2650, vol. 82, No. 11.
Kryger, Matt, "Applications of Thiol-ENE Coupling", Abstract, Dec. 11, 2008, pp. 1-8, Retrieved from the Internet, http://www.chemistry.illinois.edu/research/organic/seminar_extracts/2008_2009/Matt_Kryger_Chem535_FA08_Abstract.pdf *whole document*.
Moad, Graeme et al., "Living Radical Polymerization by the RAFT Process", Australian J. Chemistry 2005, vol. 58, pp. 379-410, Retrieved from the Internet: URL: http://www.publish.csiro.au/journals/ajc *whole document*.
Lutz, Jean-Francois, "Modular Chemical Tools for Advanced Macromolecular Engineering", Polymer, vol. 49, Issue 4, Feb. 18, 2008, pp. 817-824.
Harrisson, Simon, "Radical-Catalyzed Oxidation of Thiols by Trithiocarbonate and Dithioester RAFT Agents: Implications for the Preparation of Polymers with Terminal Thiol Functionality", Macromolecules, Jan. 13, 2009, Retrieved from the Internet: URL: http://www.pubs.acs.org "whole document".
Mori, Noriko, et al., "Temperature-Induced Changes in the Surface Wettability of SBR + PNIPA Films", Macromolecular Materials and Engineering, 2007, vol. 292, pp. 917-922, Retrieved from the Internet: URL: http://www.mme-journal.de *whole document*.
Brummelhuis, Niels ten et al., "Thiol-Ene Modification of 1,2-Polybutadiene Using UV Light or Sunlight", Macromolecules, 2008, 41, pp. 9946-9947, Retrieved from the Internet: URL: http://www.pubs.acs.org *whole document*.

\* cited by examiner

*Primary Examiner* — Jeffrey Mullis
(74) *Attorney, Agent, or Firm* — John D. DeLong

(57) ABSTRACT

The present invention is directed to a polymer blend, the blend including a diene-based elastomer grafted with a substituted acrylamide polymer through a sulfur atom, and from 1 to 20 percent by weight of an additional polymer miscible with the substituted acrylamide polymer.

15 Claims, 13 Drawing Sheets

SEE FIG 11A

SEE FIG 10A

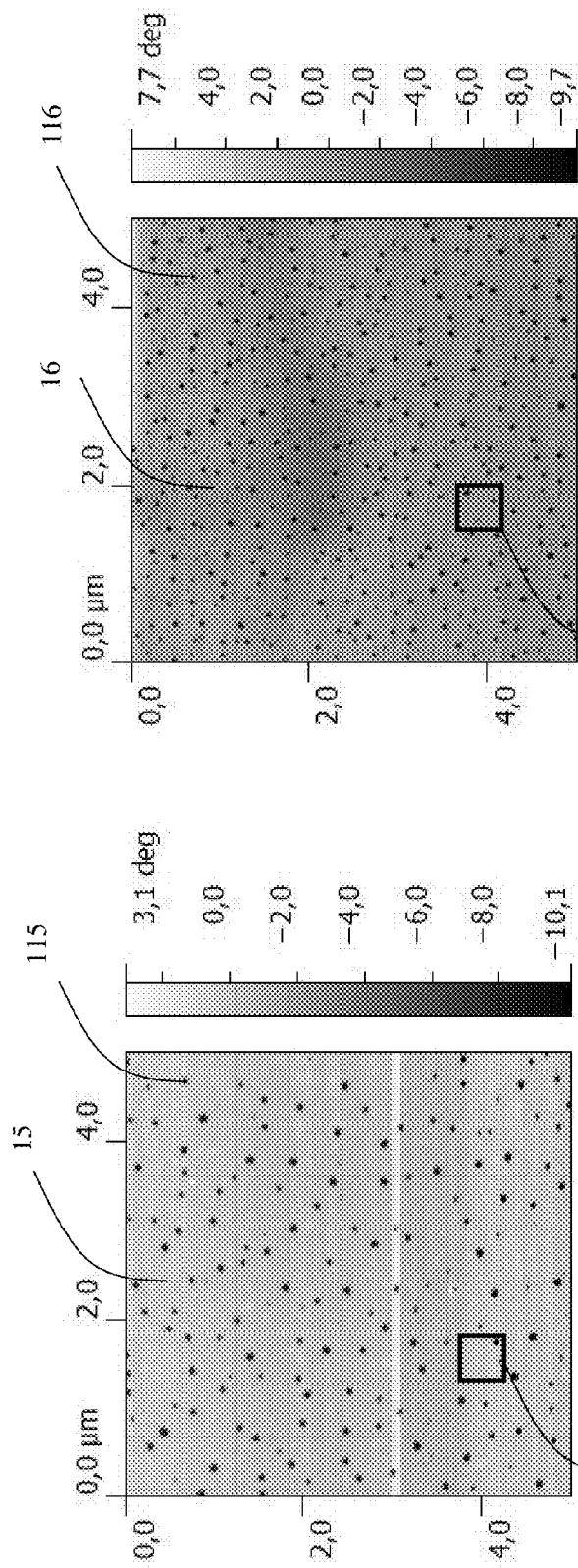

BLEND OF A GRAFT COPOLYMER AND A SECOND POLYMER MISCIBLE WITH SIDECHAINS OF THE GRAFT COPOLYMER

BACKGROUND OF THE INVENTION

Aqueous solutions of a variety of polar aprotic polymers exhibit a lower critical solution temperature (LCST). When these solutions are heated above the LCST, the intramolecular hydrogen bonding is preferred compared to the hydrogen bonding with water molecules. This leads to collapse of the polymer coils and a precipitation of the polymer from solution. This phase transition is reversible so that the polymer redissolves when the temperature is again decreased below the LCST. A well-known example for an LCST polymer is poly(N-isopropyl acrylamide) (PNIPAM). Aqueous solutions of this polymer exhibit an LCST transition at about 31° C.

The combination of LCST polymers with elastomers offers the possibility of better control of elastomer performance in a variety of applications where the elastomer is exposed to water. Simple mixing of an LCST polymer with an elastomer results in a compound that will experience macrophase separation due to the lack of covalent bonds between the LCST polymer and the elastomer. Such a macrophase separation will most likely have a detrimental effect on compound performance.

More broadly, such a macrophase separation can lead to inferior physical properties in a compound even in polymers without LCST behavior.

There is therefore a need for a polymer having both elastomeric and LCST properties.

SUMMARY OF THE INVENTION

The present invention is directed to a polymer blend comprising a copolymer and an additional polymer, the copolymer comprising: a polymeric backbone chain derived from a monomer comprising at least one conjugated diene monomer and optionally at least one vinyl aromatic monomer; and polymeric sidechains bonded to the backbone chain, the sidechains comprising a polymer immiscible with the backbone; the additional polymer consisting of a polymer miscible with the polymeric sidechains.

BRIEF DESCRIPTION OF THE DRAWINGS

FIG. 15 shows an atomic force microscopy micrograph of a blend of SBR and 2 percent by weight of additional PNIPAM homopolymer.

FIG. 15A shows a magnified region of the sample in FIG. 15.

FIG. 16 shows an atomic force microscopy micrograph of an SBR functionalized with 2 percent by weight of PNIPAM.

FIG. 16A shows a magnified region of the sample in FIG. 16.

DETAILED DESCRIPTION

Figure 1:
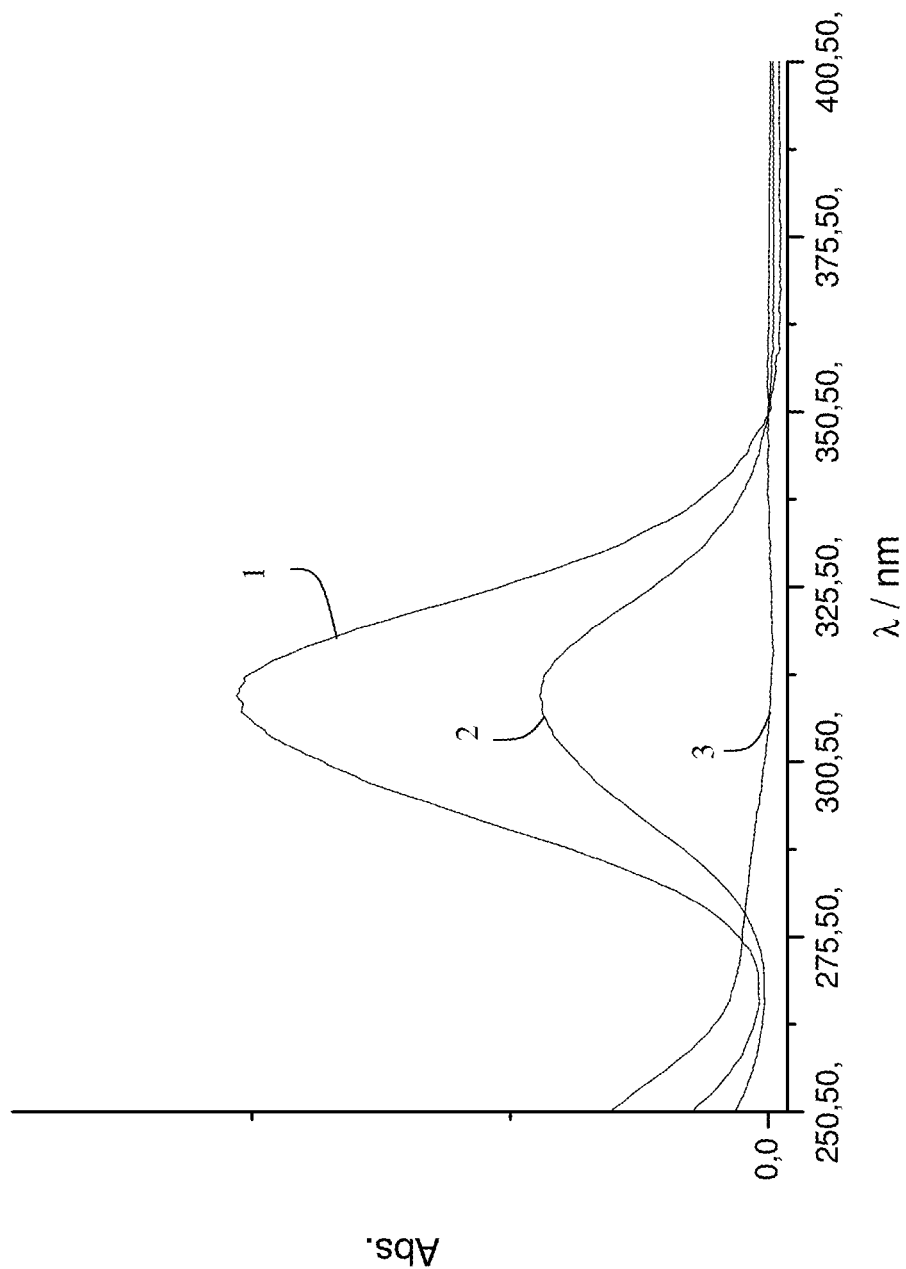
FIG. 1 shows UV-VIS spectra of a trithiocarbonate RAFT chain transfer agent, PNIPAM with a trithiocarbonate-end group and PNIPAM with a thiol group.

There is disclosed a polymer blend comprising a copolymer and an additional polymer, the copolymer comprising: a polymeric backbone chain derived from a monomer comprising at least one conjugated diene monomer and optionally at least one vinyl aromatic monomer; and polymeric sidechains bonded to the backbone chain, the sidechains comprising a polymer immiscible with the backbone; the additional polymer consisting of a polymer miscible with the polymeric sidechains.

In one embodiment, the copolymer has the structure I

where X is a polymer derived from a monomer comprising at least one conjugated diene monomer and optionally at least one vinyl aromatic monomer; Z is a polymer capable of exhibiting a lower critical solution temperature (LCST); Y is a divalent group bonded to both X and Z; and n is the number of —[Y—Z] groups bonded to X.

In one embodiment, the polymer X is a diene based elastomer comprising at least one carbon-carbon double bond. The phrases "rubber or elastomer containing olefinic unsaturation" or "diene based elastomer" as used herein are equivalent and are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic rubbers are the homopolymerization products of butadiene and its homologues and derivatives, for example, methylbutadiene (i.e., isoprene), dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1, 4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, c is 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The term "phr" as used herein, and according to conventional practice, refers to "parts by weight of a respective material per 100 parts by weight of rubber, or elastomer."

In one embodiment, the polymer Z capable of exhibiting a lower critical solution temperature (LCST) includes homopolymers and copolymers of various second monomers known to have LCST behavior, including but not limited to polymers of: acrylamides and substituted acrylamides, methacrylamides and substituted methacrylamides, acrylic acids and substituted acrylic acids, methacrylic acids and substituted methacrylic acids, vinyl alkyl ethers and substituted vinyl alkyl ethers, vinyl caprolactams and substituted vinyl caprolactams, and other monomers known to lead to polymers with LCST behavior, such as oligo(ethylene glycol) methacrylate and 2-(2-methoxyethoxy) ethyl methacrylate, and the like.

By "capable of exhibiting a lower critical solution temperature (LCST)," it is meant that in the presence of water, the polymer Z associates with the water to form a water-swollen polymer phase, wherein the water-swollen polymer phase will show an LCST transition when heated from a temperature below the LCST to a temperature above the LCST. The polymer Z is accordingly capable of exhibiting an LCST when the polymer Z exists as a side chain on the graft copolymer.

In one embodiment, the polymer Z is a polymer of a second monomer of formula II

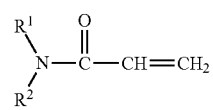

where $R^1$ and $R^2$ are independently selected from the group consisting of hydrogen, C2 to C6 linear alkyl, C2 to C6 branched alkyl, and C3 to C6 cycloalkyl, with the proviso that at least one of $R^1$ and $R^2$ is not hydrogen.

In one embodiment, Z is of formula (III)

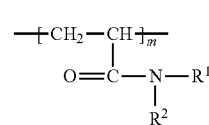

where $R^1$ and $R^2$ are independently selected from the group consisting of hydrogen, C2 to C6 linear alkyl, C2 to C6 branched alkyl, and C3 to C6 cycloalkyl, with the proviso that at least one of $R^1$ and $R^2$ is not hydrogen, and m is the degree of polymerization of the hydrocarbon chain.

In one embodiment, the polymer Z is a polymer of an N-substituted acrylamide derivative.

In one embodiment, the polymer Z is a polymer of N-isopropylacrylamide, N-cyclopropylacrylamide, or N,N-diethylacrylamide.

In one embodiment, the polymer Z capable of exhibiting a lower critical solution temperature has a weight average molecular weight ranging from about 500 to about 20000 g/mol.

In one embodiment, the polymer Z capable of exhibiting a lower critical solution temperature has a lower critical solution temperature in a range of from about 0° C. to about 100° C.

In one embodiment, the copolymer comprises from about 0.2 to about 20 weight percent Z.

Y is a divalent group bonded to both X and Z. In one embodiment, Y is sulfur or oxygen. In one embodiment, Y is sulfur.

Generally, Y originates as a terminal functional group of the polymer Z capable of reacting with a carbon-carbon double bond of the polymer X. Thus, as it exists in the copolymer Y links X to Z. In one embodiment, the terminal functional group is a thiol group. Such a terminal functional group may be incorporated into the polymer Z during polymerization, for example, through use of a suitable chain transfer agent or terminating agent as is known in the art.

The number n of —[—Y—Z] groups bonded to X ranges from about 1 to about 30 in a given copolymer molecule.

The copolymer may be produced by various methods. In one embodiment, the copolymer may be produced by functionalizing the polymer X with side chains of LCST polymer Z to produce a graft copolymer with an elastomer backbone and LCST polymer sidechains. A convenient way for the functionalization of a variety of elastomers is the thiol-ene reaction during which alkene moieties being present in the elastomers are transformed into thioethers by reaction with thiols. This reaction proceeds preferably with vinyl groups as they are present in styrene-butadiene rubbers, butadiene rubbers, and polyisoprene rubbers. In order to allow the functionalization of the elastomers, the LCST polymers may feature thiol end groups. These can be introduced by reaction of thiocarbonylthio endgroups with nucleophilic agents. Polymers exhibiting thiocarbonylthio end groups can be produced by reversible addition-fragmentation chain transfer (RAFT) polymerization. One reaction scheme describes the use of PNIPAM as LCST polymer, however, this invention is not limited to that as any LCST polymer with a reactive end group, which for example can be produced by RAFT polymerization, can be used for the functionalization of the elastomer.

One step of the method to produce the graft copolymer is to obtain, a first polymer comprising at least one carbon-carbon double bond.

A second step of the method is obtaining a second polymer, the second polymer capable of exhibiting a lower critical solution temperature (LCST) and comprising a terminal functional group capable of reacting with the carbon-carbon double bond of the first polymer.

In one embodiment, the second polymer is obtained by polymerizing a second monomer in the presence of a thiocarbonylthio RAFT chain transfer agent to form a polymer comprising a terminal thiocarbonylthio group; and cleaving the terminal thiocarbonylthio group to a thiol group to form the second polymer comprising a terminal thiol group.

In one embodiment, the terminal functional group of the second polymer is incorporated in the second polymer during polymerization through the mechanism of reversible addition-fragmentation chain transfer (RAFT). More details of the RAFT polymerization mechanism may be found by reference to Moad et al., *Aust. J. Chem.* 2005, 58, 379-410. As is known in the art, RAFT polymerization of free-radical polymerizable monomers is accomplished in the presence of a thiocarbonylthio RAFT chain transfer agent of general formula (IV)

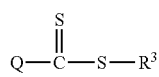
(IV)

where $R^3$ is a free radical leaving group able to reinitiate polymerization, and Q is a functional group that influences the rate of radical addition and fragmentation. Suitable thiocarbonylthio RAFT chain transfer agents include dithioesters, trithiocarbonates, dithiocarbamates, and xanthates. In one embodiment, the thiocarbonylthio chain transfer agent is a trithiocarbonate. In one embodiment, the thiocarbonylthio chain transfer agent is selected from the group consisting of S-1-dodecyl-S-(αα'-dimethyl-α''-acetic acid) trithiocarbonate and 4-cyano-4-dodecylsulfanylthiocarbonylsulfanyl-4-methyl butyric acid.

(V)

Upon RAFT polymerization in the presence of a suitable thiocarbonylthio chain transfer agent, the chain-terminated polymer has the general formula (V)

(V)

where $P_n$ represents the polymer chain exhibiting a LCST.

The chain terminated polymer of formula V is then reacted with a suitable nucleophile to cleave the C—S linkage to obtain a second polymer of formula (VI) having a terminal thiol group

(VI)

In one embodiment, the chain terminated polymer of formula V is treated by aminolysis to obtain the thiol-terminated polymer of formula VI.

A third step of the method is reacting the second polymer with the first polymer to form a graft copolymer, the graft copolymer comprising a backbone derived from the first polymer and sidechains derived from the second polymer. During reacting of the second polymer with the first polymer, a second polymer is linked to the first polymer through reaction of a terminal functional group of the second polymer with the unsaturated carbon-carbon bond of the first polymer.

In one embodiment, the thiol-terminated second polymer is reacted with the first polymer in the presence of a free-radical initiator via a thiol-ene reaction as is known in the art, see for example *Macromolecules* 2008, 41, 9946-9947. In one embodiment, the free-radical initiator is selected from the group consisting of 2,4,6-Trimethylbenzoyldiphenylphosphine oxide and azobisisobutyonitrile (AIBN).

A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute.

In one aspect, the use of suitable polymer X and suitable polymer Z of the specified composition may result in a rubber composition having at least two polymer phases.

In this manner, it is considered herein that the relatively low Tg polymer X is relatively incompatible with, or immiscible with, the relatively high Tg polymer Z as evidenced by their individual Tan delta peaks on a graphical presentation, or plot, of Tan delta versus temperature cured of the rubber composition within a temperature range emcompassing the entire transition temperature range for both polymers, which may typically be from about −110° C. to about +150° C. The term "transition temperature" is meant to include both glass transition temperature Tg and melting temperature Tm, in the case of crystalline or partially crystalline materials.

Accordingly, the polymers of the rubber composition may be present in at least two phases, comprised of a polymer X phase and a polymer Z phase.

In particular, a graphical plot of Tan delta versus temperature curve within a broad range of −110° C. to 150° C. for the rubber composition of this invention may yield two peaks in the curve with one peak having its apex within a relatively low temperature range corresponding to the polymer X and a second peak with its apex within a higher temperature range corresponding to the polymer Z.

Thus, one indication of the polymer incompatibilities is the presence of the dual Tan delta peaks for the cured elastomer composition. The Tan delta values, with the included peaks in their curves, can be determined by dynamic mechanical testing of the cured compound by procedures well known to those skilled in such art.

Alternatively, immiscibility of polymer Z in polymer X may be seen visually, as with atomic force microscopy and the like. Micrographs of the rubber composition may show visibly distinct polymer phases of polymer X and polymer Z, appearing generally as dispersed phase regions of polymer Z in a continuous phase of polymer X.

The combination of the copolymer with an additional polymer that is miscible with the polymer Z, but immiscible with the polymer X, will result in a polymer blend wherein the additional polymer is selectively combined with the polymer Z.

In one embodiment, the additional polymer includes homopolymers and copolymers of various monomers known to have LCST behavior, including but not limited to polymers of: acrylamides and substituted acrylamides, methacrylamides and substituted methacrylamides, acrylic acids and substituted acrylic acids, methacrylic acids and substituted methacrylic acids, vinyl alkyl ethers and substituted vinyl alkyl ethers, vinyl caprolactams and substituted vinyl caprolactams, and other monomers known to lead to polymers with LCST behavior, such as oligo(ethylene glycol) methacrylate and 2-(2-methoxyethoxy) ethyl methacrylate, and the like.

In one embodiment, the additional polymer is a polymer of a monomer of formula II

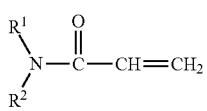

(II)

where $R^1$ and $R^2$ are independently selected from the group consisting of hydrogen, C2 to C6 linear alkyl, C2 to C6 branched alkyl, and C3 to C6 cycloalkyl, with the proviso that at least one of $R^1$ and $R^2$ is not hydrogen.

In one embodiment, the additional polymer is of formula (III)

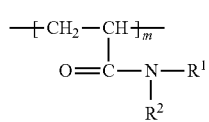

(III)

where $R^1$ and $R^2$ are independently selected from the group consisting of hydrogen, C2 to C6 linear alkyl, C2 to C6 branched alkyl, and C3 to C6 cycloalkyl, with the proviso that at least one of $R^1$ and $R^2$ is not hydrogen, and m is the degree of polymerization of the hydrocarbon chain.

In one embodiment, the additional polymer is a polymer of an N-substituted acrylamide derivative.

In one embodiment, the additional polymer is a polymer of N-isopropylacrylamide, N-cyclopropylacrylamide, or N,N-diethylacrylamide.

In one embodiment, the additional polymer capable of exhibiting a lower critical solution temperature has a weight average molecular weight ranging from about 500 to about 20000 g/mol.

In one embodiment, the additional polymer capable of exhibiting a lower critical solution temperature has a lower critical solution temperature in a range of from about 0° C. to about 100° C.

In one embodiment, the polymer blend comprises from about 1 to about 20 weight percent of the additional polymer.

The polymer blend may be used in any rubber or elastomer article of manufacture. For example, applications of the polymer blend includes reinforced hoses, transmission belts, drive belts, air springs, conveyor belts, drive tracks, shoe soles and the like.

The invention is further illustrated by the following non-limiting examples.

Example 1

In this example, preparation of poly-(N-isopropylacrylamide), or PNIPAM, is illustrated.

RAFT-polymerization was used for the preparation of PNIPAM. For this purpose the following chain transfer agent (CTA) were prepared: 4-Cyano-4-dodecylsulfanylthiocarbonylsulfanyl-4-methyl butyric acid (CDSMB).

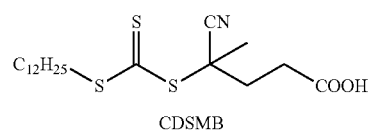

CDSMB

The RAFT reaction scheme is as follows:

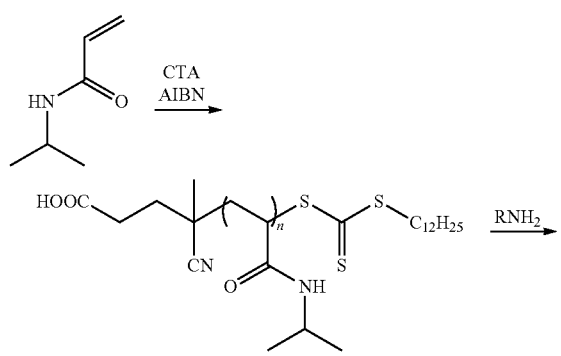

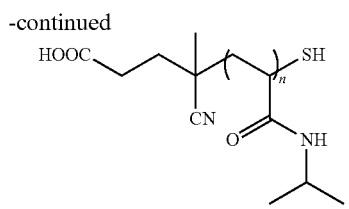

Synthesis of Chain Transfer Agent (CDSMB)

4-Cyano-4-dodecylsulfanylthiocarbonylsulfanyl-4-methyl butyric acid was synthesized in two steps. The first step was prepared using literature procedure [W. G. Weber, J. B. McLeary, R. D. Sanderson, *Tetrahedron Lett.* 2006, 47, 4771.].

Step 1: Bis-(dodecylsulfanylthiocarbonyl)disulfide

Yield: 72%
$^1$H-NMR (CDCl$_3$/300 MHz): δ [ppm]: 0.86 (t, 6H); 1.11-1.43 (m, 36H); 1.65 (q, 4H); 2.66 (t, 4H)

Step 2: 4-Cyano-4-dodecylsulfanylthiocarbonylsulfanyl-4-methyl butyric acid 10 g of Bis-(dodecylsulfanylthiocarbonyl)disulfide and 7.7 g of 4,4'-azobis(4-cyano)pentaneacid were dissolved in 60 ml of freshly distilled dioxane. The mixture was degassed under a stream of argon for one hour and heated at 80° C. under argon atmosphere for 21 hours. The solvent was evaporated and the resulting dark orange oil was recrystallized from hexanes twice.
Yield: 52%
$^1$H-NMR (CDCl$_3$/300 MHz): δ [ppm]: 0.87 (t, 3H); 1.12-1.45 (m, 18H); 1.68 (q, 2H); 1.87 (s, 3H); 2.30-2.63 (m, 2H), 2.68 (t, 2H); 3.32 (t, 2H)

Synthesis of PNIPAM-CTA

All NIPAM-polymers were prepared in a Schlenk tube containing N-isopropyacrylamide, CTA, AIBN and dry dioxane as a solvent. The exact amount of all components is given in Table 1. After three freeze-pump thaw cycles the mixture was placed in a preheated oil bath at 80° C. for 20 hours. The mixture was precipitated in hexane (poor solvent)/THF (good solvent) three times and dried under vacuum. Table 2 further shows the amount of used NIPAM (N-isopropylacrylamide) monomer, CTA (DMP or CDSMB), AIBN and dioxane. The yield refers to the amount of monomer used. Molecular weights were measured by GPC in DMF using PMMA as calibration.

The cleavage of the trithiocarbonate end group was done by aminolysis. The aminolysis was performed by stirring a mixture of PNIPAM-CTA, tributylphosphine and amine in THF for several hours at room temperature. The transformation to the thiol-group was tested with two amines: ethanolamine and hexylamine.

Kinetic measurements by UV-vis spectroscopy confirmed the completeness of the reaction after one hour. The spectrum was measured every 15 minutes after adding the amine to the solution of the polymer.

The cleavage of the trithiocarbonate-group was confirmed by UV-vis spectroscopy for both amines by absence of the absorption band at 310 nm (C=S). For further studies hexylamine was chosen for the cleavage because of its good solubility in hexane, which was used to precipitate the polymer after the reaction. FIG. 1 compares the spectra of the pure CTA (1), and PNIPAM with trithiocarbonate-end group (2) and SH-end group (3), at which the decrease and loss the absorption band of the trithiocarbonate group is shown.

Figure 2:
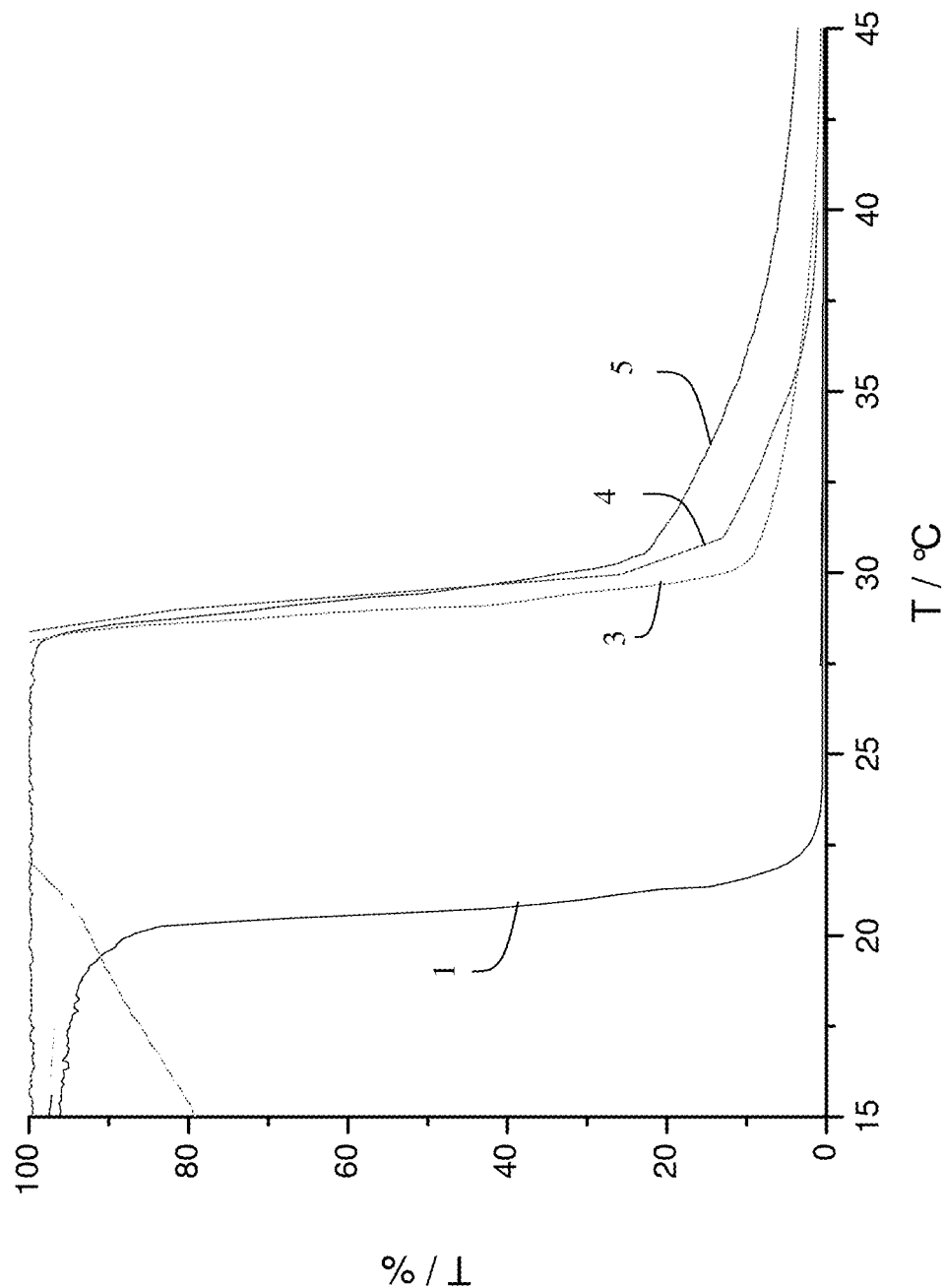
FIG. 2 shows transmission measurement of turbidity versus temperature for several PNIPAM polymers with CTA endgroups.

LCST of the RAFT-synthesized PNIPAM with the CTA endgroup was determined by measurement of temperature dependant turbidity of poly-(N-isopropylacrylamide) in water at 632 nm using UV-vis spectroscopy. The solutions had a concentration of 5 mg/ml. The LCST was defined as the temperature at 50% transmission. As is known the LCST depends on the end group and the molecular weight of the polymer. Very short polymers have a lower LCST because of the influence of hydrophobic end groups on the LCST. The influence of the hydrophobic groups on the LCST diminishes for longer polymer chains. This can be seen for some of the polymers of Table 2 as seen in FIG. 2, where sample PNI1 (1) having a relatively low molecular weight exhibits a LCST of 20.6° C., which is about 11° C. lower than the LCST of the higher molecular weight samples PNI6 (3), PNI10 (4), and PNI4 (5) which was detected at about 31° C.

Example 2

In this example, functionalization of a styrene-butadiene rubber with PNIPAM is illustrated.

Synthesis of Functionalized Rubber Elastomers

Functionalized elastomer was produced using the following general procedure: A solution of SBR, AIBN and the thiol-functionalized PNIPAM from Example 1 in dry THF was degassed under argon atmosphere at room temperature for 2 hours. The exact amount of educts for each reaction is shown in Table 3. The reaction mixture was then placed in a preheated oil bath at 70° C. for at least 20 hours. To make sure that no free thiol was in the reaction product, the product was

TABLE 1

| Sample | NIPAM/ mmol | CDSMB/ mmol | AIBN/ mmol | Dioxane/ ml | Yield/% | M (calc.)/ (g/mol) | M (GPC)/ (g/mol) | PDI |
| --- | --- | --- | --- | --- | --- | --- | --- | --- |
| PNI 4 | 8.8 | 0.18 | 0.02 | 6 | 96 | 5658 | 4727 | 1.17 |
| PNI 5 | 8.8 | 0.10 | 0.01 | 6 | 89 | 10184 | 6096 | 1.18 |
| PNI 6 | 8.8 | 0.18 | 0.02 | 6 | 98 | 5658 | 4723 | 1.16 |
| PNI 7 | 8.8 | 0.09 | 0.01 | 6 | 96 | 11316 | 5905 | 1.13 |
| PNI 8 | 17.7 | 0.29 | 0.03 | 8 | 96 | 6790 | 5749 | 1.19 |
| PNI 9 | 17.7 | 0.25 | 0.03 | 8 | 92 | 7921 | 5202 | 1.17 |
| PNI 10 | 17.7 | 0.20 | 0.02 | 8 | 93 | 10184 | 6785 | 1.37 |
| PNI 11 | 17.7 | 0.59 | 0.06 | 8 | 99 | 3395 | 3055 | 1.14 | dialyzed against THF for three days. After the dialysis the solvent was evaporated and the product was dried under vacuum. The results of the elementary analysis of three functionalized elastomers are shown in Table 4, with the calculated weight percent of PNIPAM in the resulting functionalized SBR.

Figure 3:
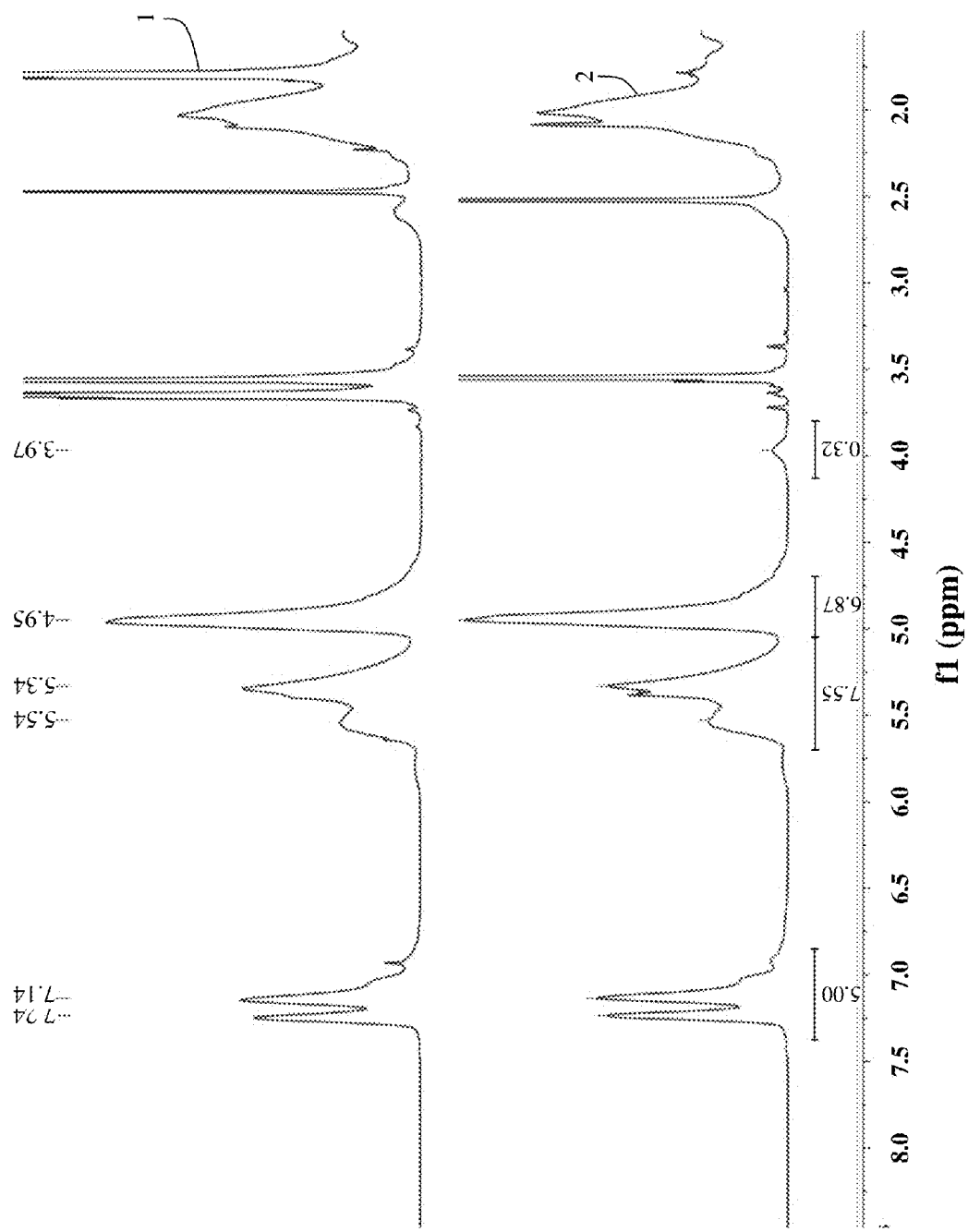
FIG. 3 shows the $^1$H-NMR spectrum of a styrene-butadiene elastomer and of a styrene-butadiene elastomer functionalized with PNIPAM.
Figure 4:
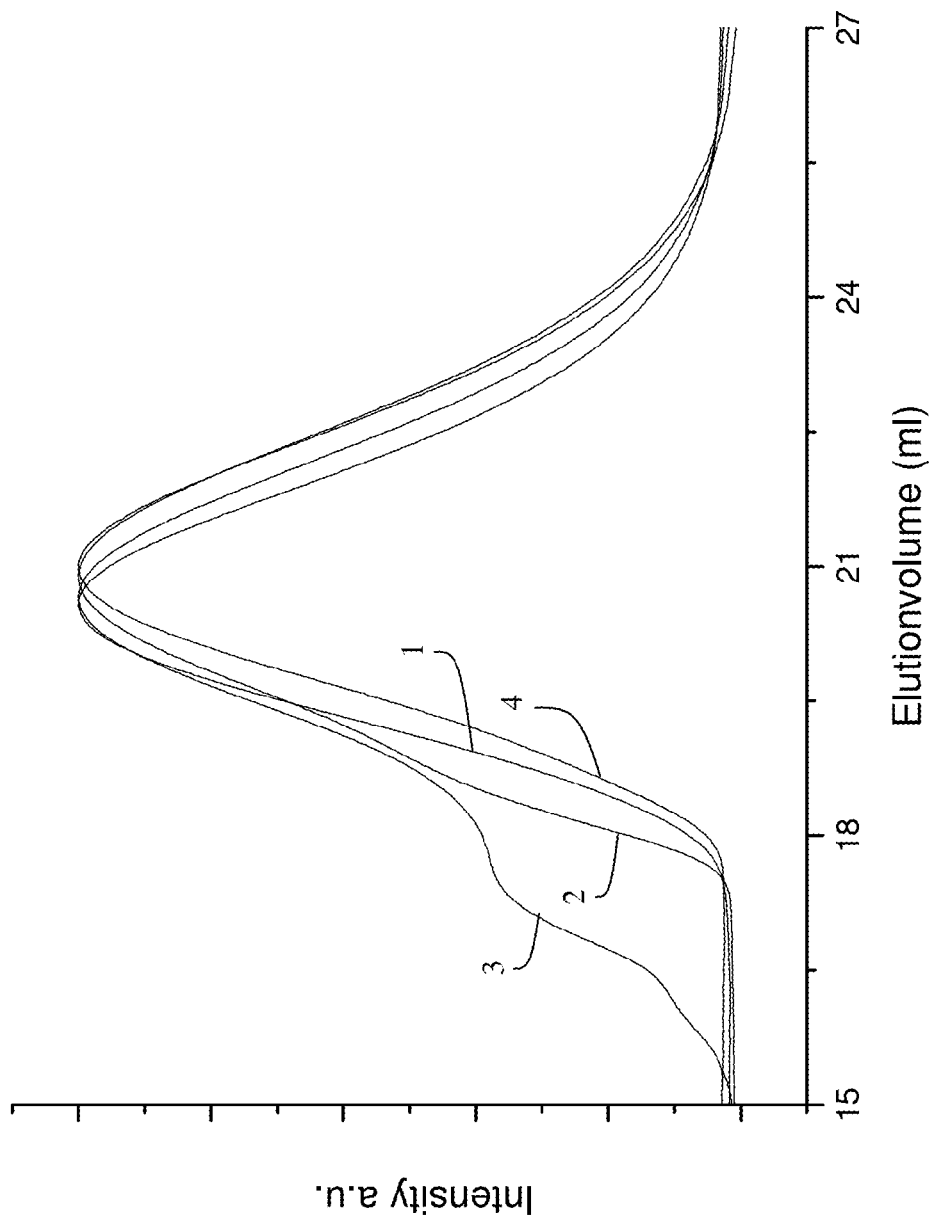
FIG. 4 shows GPC curves for a styrene-butadiene elastomer and for three PNIPAM-functionalized styrene-butadiene elastomers.

The $^1$H-NMR spectrum of the SBR (1) and of the functionalized rubber (2) are shown in FIG. 3. As seen in FIG. 3, the typical elastomer signals are observable, but also the peak of the CH-group of the isopropyl-group of PNIPAM at 3.97 ppm. Again a decrease of the vinyl signals at 4.95 ppm can be observed, indicating a successful functionalization. GPC measurements indicated little cross linking if any of all samples as seen in FIG. 4. FIG. 4 shows exemplary GPC curves for the SBR (1) and for three functionalized elastomers SBR2 (2), SBR5 (3) and SBR6 (4). As indicated by the presence of the shoulder at about 16-17 ml elution volume in FIG. 4, SBR6 showed no cross linking during the reaction, SBR2 showed very little cross linking and SBR 5 shows some cross linking. All three samples were soluble, indicating they were not greatly cross linked.

TABLE 3

| Sample | weight PNIPAM/ (SBR) | PNIPAM used[1] | mass SBR/g | mass AIBN/g | mass thiol/ g | M (PNIPAM-SH)/(g/mol) |
|---|---|---|---|---|---|---|
| SBR 1 | 20 | PNI6 | 1.0 | 0.027 | 0.20 | 4723 |
| SBR 2 | 20 | PNI7 | 1.0 | 0.027 | 0.20 | 5950 |
| SBR 3 | 10 | PNI8 | 1.0 | 0.022 | 0.10 | 5749 |
| SBR 4 | 15 | PNI8 | 1.0 | 0.023 | 0.15 | 5749 |
| SBR 5 | 5 | PNI8 | 1.0 | 0.020 | 0.05 | 5749 |

[1]from Example 1

TABLE 4

| Sample | SBR | SBR 3 | SBR 4 | SBR 5 |
|---|---|---|---|---|
| Measurement 1 | 3.753 mg | 6.968 mg | 3.472 mg | 1.344 mg |
| C/ % | 89.72 | 86.95 | 85.05 | 88.21 |
| H/ % | 10.50 | 10.20 | 10.14 | 8.87 |
| N/ % | 0 | 1.03 | 1.29 | 0.42 |
| S/ % | 0 | 0.08 | 0.29 | 0.32 |
| PNIPAM in SBR/ wt % | | 8.32 | 10.42 | 3.39 |
| Measurement 2 | 4.882 mg | 2.812 mg | 5.129 mg | 1.164 mg |
| C/ % | 89.75 | 86.81 | 85.03 | 87.92 |
| H/ % | 10.48 | 10.50 | 10.17 | 9.07 |
| N/ % | 0 | 1.01 | 1.30 | 0.35 |
| S/ % | 0 | 0.12 | 0.12 | 0.30 |
| PNIPAM in SBR/ wt % | | 8.16 | 10.50 | 2.83 |

Example 3

In this example, the effect of PNIPAM-functionalization on the wettability of a styrene-butadiene rubber is illustrated. Wettability of the functionalized SBR was determined by measuring the contact angle of water droplets on a glass plate coated with the functionalized polymer.

Contact angle was measured following the procedure. The functionalized SBR samples were dissolved in THF and spin-coated on a glass slide. After drying in vacuum the slides were placed under a needle and a water droplet was purged out of the needle onto the coated glass. The contact angle was determined by measurement of the inner angle between the droplet and the glass surface. Contact angle was measured for each of the series of functionalized SBR at two temperatures, 22° C. and 45° C. These temperatures were chosen as being well below and above the 32° C. LCST for PNIPAM. The samples used corresponded to SBR3, SBR4, SBR5 and SBR2.

Figure 5:
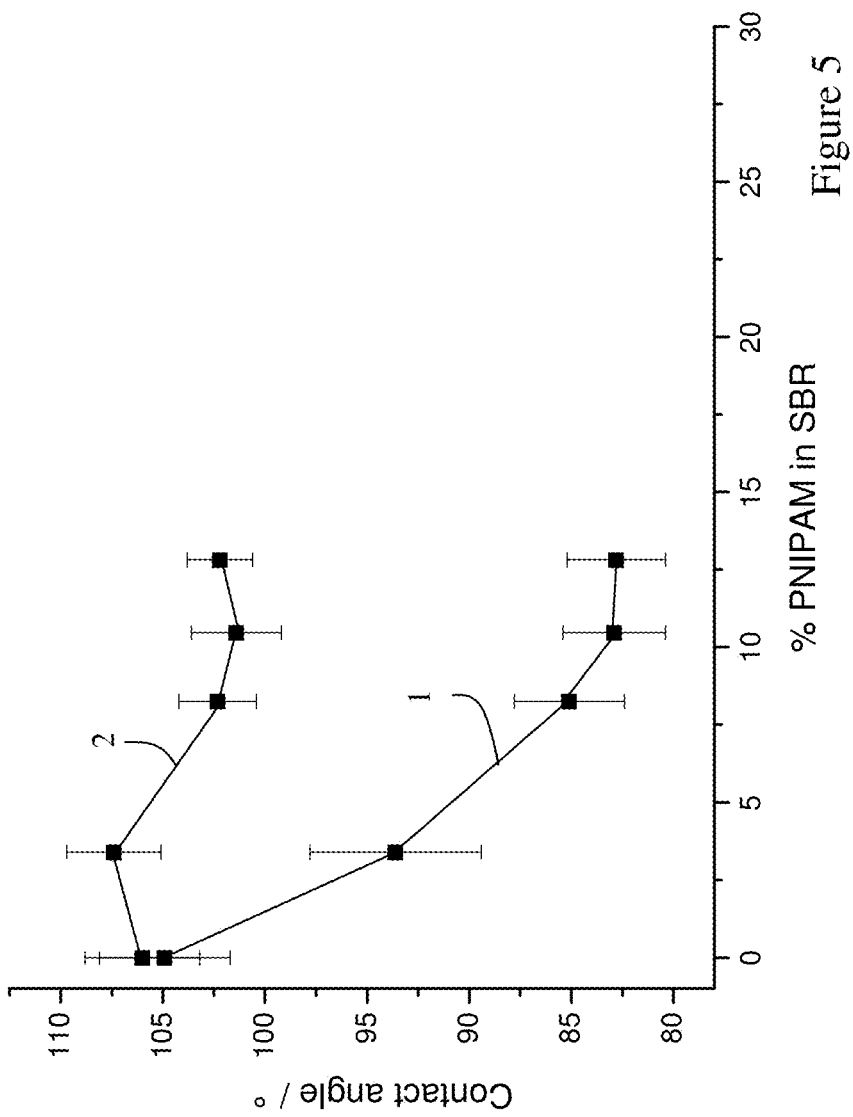
FIG. 5 shows contact angle as a function of PNIPAM content of PNIPAM functionalized styrene-butadiene elastomer.
Figure 6:
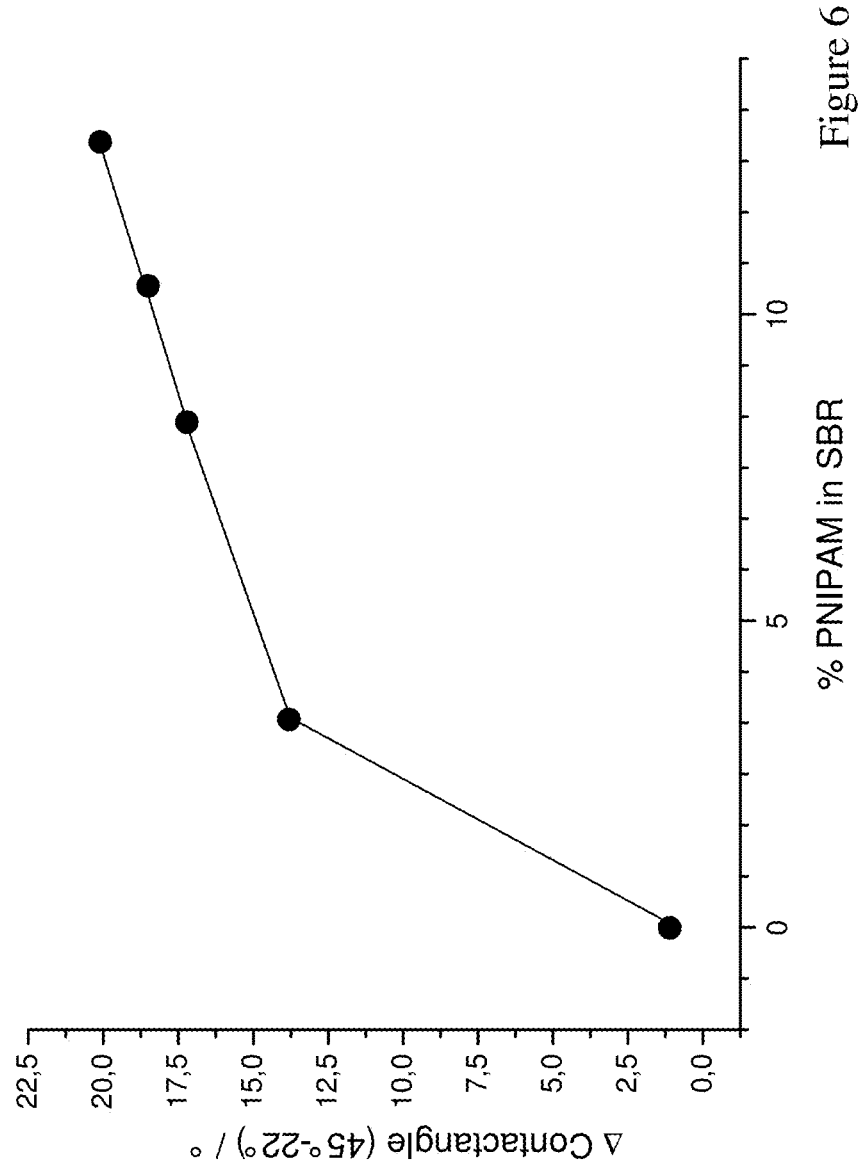
FIG. 6 shows the relative difference in contact angle above and below the LCST for PNIPAM functionalized styrene-butadiene elastomer.

FIG. 5 shows the measured contact angle as a function of PNIPAM content at each of the two temperatures 22° C. (1) and 45° C. (2). As seen in FIG. 5, the contact angle for the samples measured below the LCST at 22° C. showed a significant decrease in contact angle as the amount of PNIPAM in the polymer was increased, indicating that the functionalized polymer becomes relatively hydrophilic below the LCST. The contact angle for samples measured above the LCST at 45° C. by comparison was relatively constant, indicating that the functionalized polymer is relatively hydrophobic above the LCST. The relative difference in contact angle above and below the LCST is shown in FIG. 6, illustrating the strong increase of hydrophilic behavior with increasing PNIPAM content of the functionalized SBR.

Example 4

In this example, rheological properties of PNIPAM-functionalized SBR is illustrated.

Figure 7:
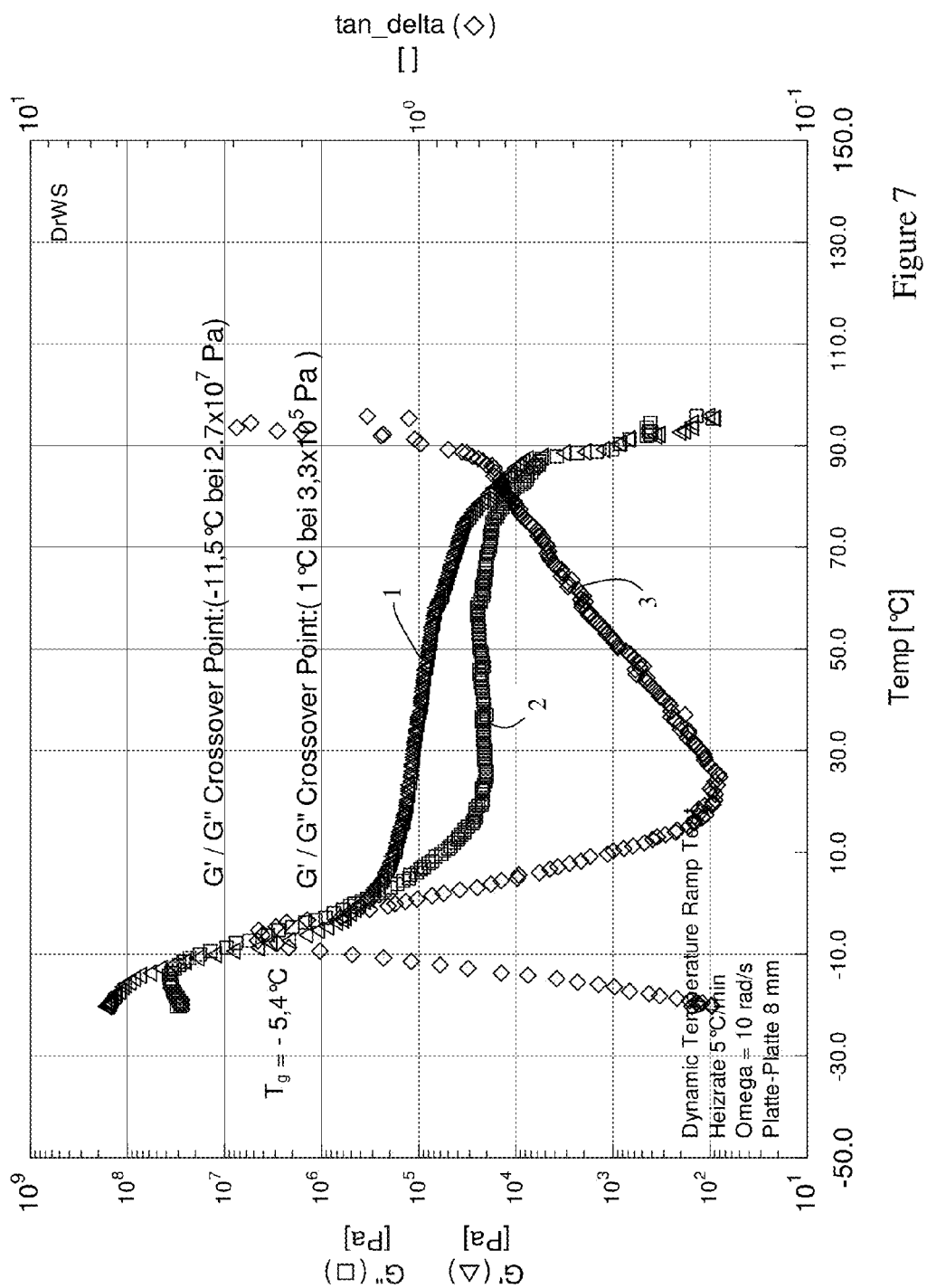
FIG. 7 shows rheological properties as a function of temperature for a styrene-butadiene elastomer.
Figure 8:
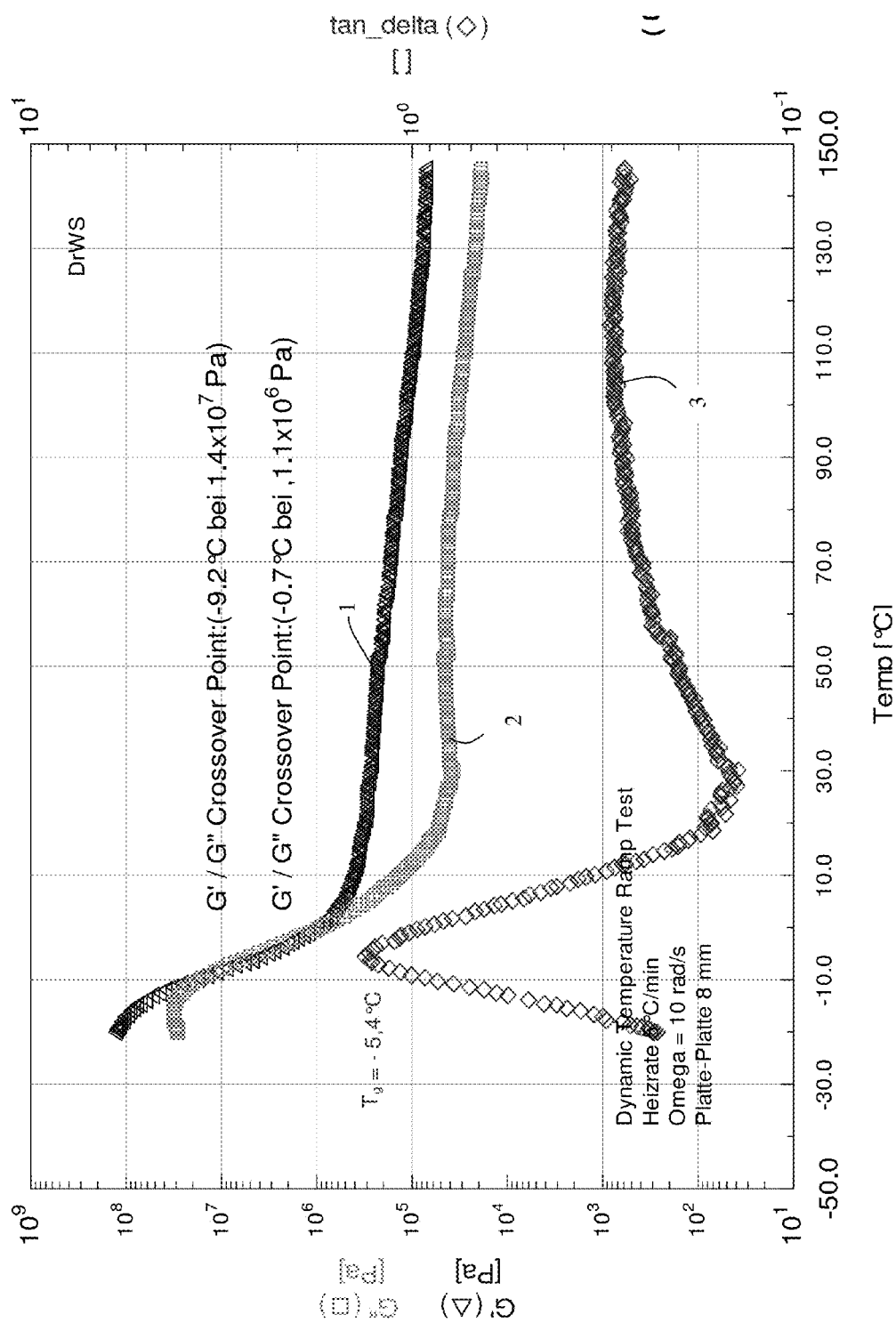
FIG. 8 shows rheological properties as a function of temperature for a graft copolymer of styrene-butadiene and PNIPAM, with 6 percent PNIPAM.
Figure 9:
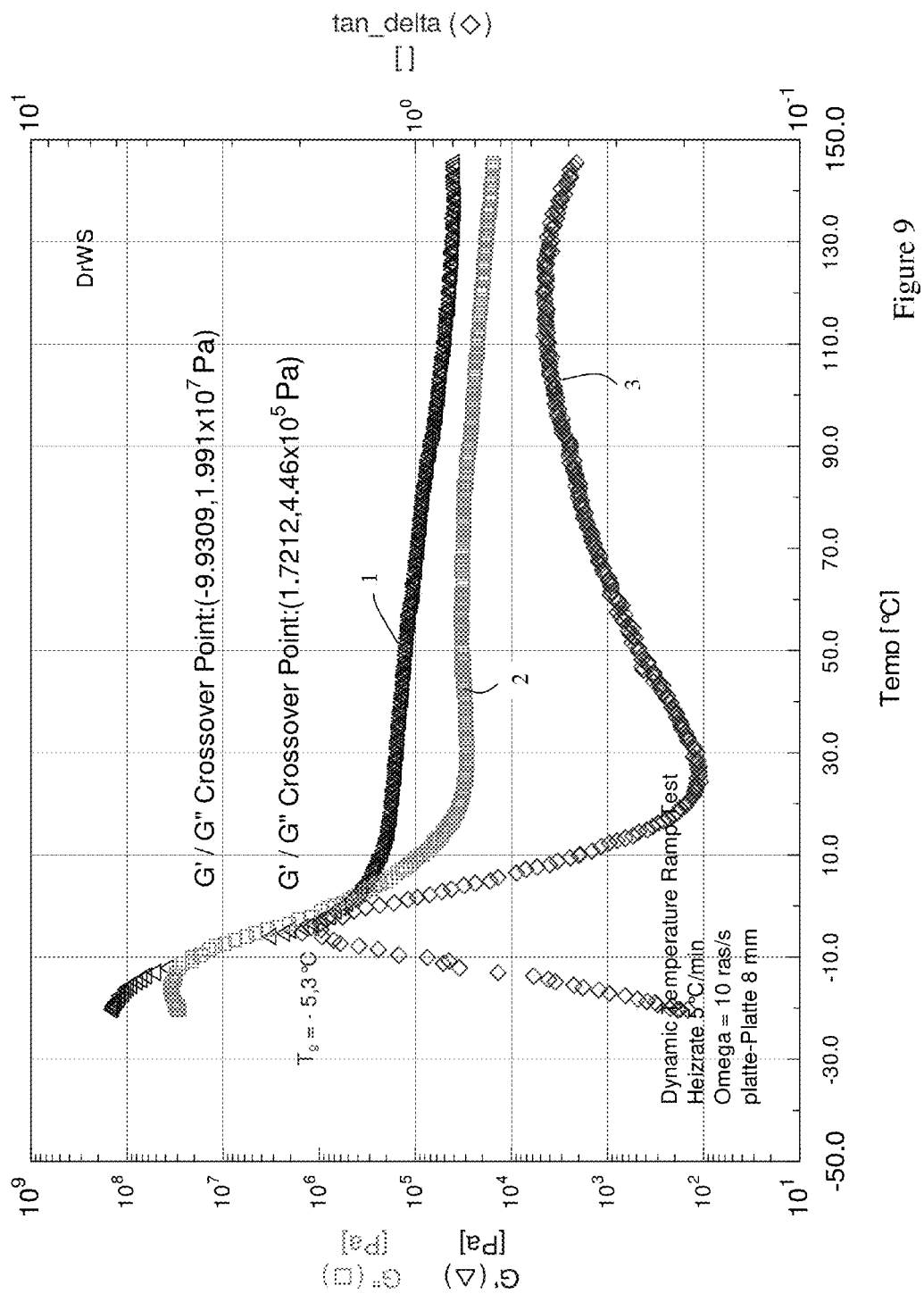
FIG. 9 shows rheological properties as a function of temperature for a graft copolymer of styrene-butadiene and PNIPAM, with 4 percent PNIPAM.

Rheological measurements were performed using a parallel plate rheometer (8 mm plates) and a heating rate of 5° C. per minute to investigate the influence of grafted PNIPAM side chains on the mechanical behavior of the SBR. FIG. 7 shows the typical rheological behavior of unmodified SBR, with a drop of G' (1) and G" (2) and increase in tan delta (3) at temperatures above about 70° C. Such behavior indicates flow of the unmodified polymer at the higher temperatures. FIGS. 8 and 9 show the rheological behavior of PNIPAM-grafted SBR for polymers with 6 percent by weight of PNIPAM (FIG. 8) and 4 percent by weight PNIPAM (FIG. 9). A seen in FIGS. 8 and 9, grafting of PNIPAM side chains to the SBR leads to a stabilization of the high temperature (above about 70° C.) rubbery plateaus at for G' (1), G" (2) and tan delta (3). Without wishing to be bound by any theory, it is believed that this may be due to a microphase separation of the PNIPAM side chains from the SBR matrix. The high Tg PNIPAM phases may act as physical crosslinks which prevent the flow of the SBR at higher temperatures. With further reference to FIGS. 8 and 9, when the SBR functionalized with 6 weight percent and 4 weight percent PNIPAM respectively are compared, it can be seen that the tan delta increase with temperature at the higher temperatures (above about 70° C.) is lower when the PNIPAM content is higher. Again while not wishing to be bound by any theory, this behavior may be due to a more efficient physical crosslinking of the SBR when the PNIPAM content is increased.

Example 5

In this example, the effect of combining a homopolymer of PNIPAM with a PNIPAM-functionalized SBR is illustrated.

PNIPAM of approximate molecular weights (Mw) 6700 and 20000 were prepared following the procedures of Example 1. SBR and additional PNIPAM homopolymer of 6700 MW were mixed to prepare a blend containing 7 percent by weight of additional PNIPAM homopolymer and labeled as Sample 6A as shown in Table 5. SBR and additional PNIPAM homopolymer of 20000 MW were mixed to prepare a blend containing 2 percent by weight of PNIPAM homopolymer and labeled as Sample 20A as shown in Table 5.

PNIPAM-functionalized styrene-butadiene rubbers were then prepared using each of the PNIPAM molecular weight samples following the procedures of Example 2.

The SBR functionalized with 6700 MW PNIPAM contained 7 percent by weight of bound PNIPAM sidechains and was labeled as Sample 6B as shown in Table 5. The SBR functionalized with 20000 MW PNIPAM contained 2 percent by weight of bound PNIPAM sidechains as was labeled as Sample 20B as shown in Table 5.

Additional samples were prepared by mixing PNIPAM homopolymer and SBR functionalized with PNIPAM of the same molecular weight as the homopolymer. Samples 6C and 6D represent blends of 3 and 6 percent by weight, respectively, of additional 6700 MW PNIPAM in SBR functionalized with 7 percent by weight of 6700 MW PNIPAM, as shown in Table 5. Sample 20C represents a blend of 5 percent by weight, respectively, of additional 20000 MW PNIPAM in SBR functionalized with 2 percent by weight of 20000 MW PNIPAM, as shown in Table 5.

Micrographs of the sample blends were obtained using atomic force microscopy and are shown in FIGS. 10-18, as indicated in Table 5.

TABLE 5

| Sample No. | Figure No. | MW PNIPAM | PNIPAM Content of SBR Blend: | |
|---|---|---|---|---|
| | | | Additional, wt % | Bound, wt % |
| 6A | 10, 10A | 6700 | 7 | 0 |
| 6B | 11, 11A, 12 | 6700 | 0 | 7 |
| 6C | 13 | 6700 | 3 | 7 |
| 6D | 14 | 6700 | 6 | 7 |
| 20A | 15, 15A | 20000 | 2 | 0 |
| 20B | 16, 16A, 17 | 20000 | 0 | 2 |
| 20C | 18 | 20000 | 5 | 2 |

Figure 10:
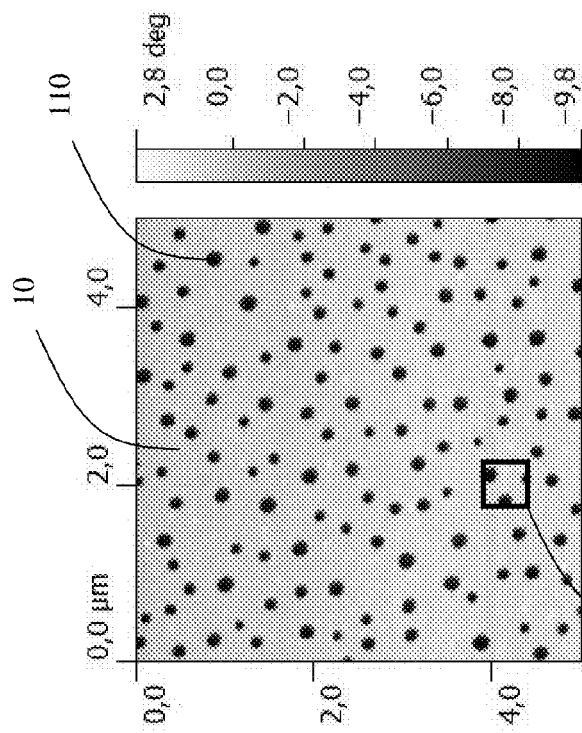
FIG. 10 shows an atomic force microscopy micrograph of a blend of SBR and 7 percent by weight of additional PNIPAM homopolymer.
Figure 10A:
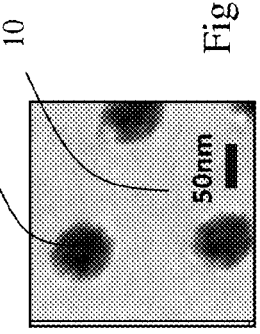
FIG. 10A shows a magnified region of the sample in FIG. 10.

With reference now to FIG. 10, a micrograph of Sample 6A (7 percent by weight of additional, 6700 MW PNIPAM in SBR) is shown. As seen in FIG. 10, regions 110 are distinct and disperse phases of PNIPAM separated from the continuous phase 10 of SBR. FIG. 10A shows in greater magnification the separation of PINIPAM phases 110 from continuous SBR phase 10.

Figure 11:
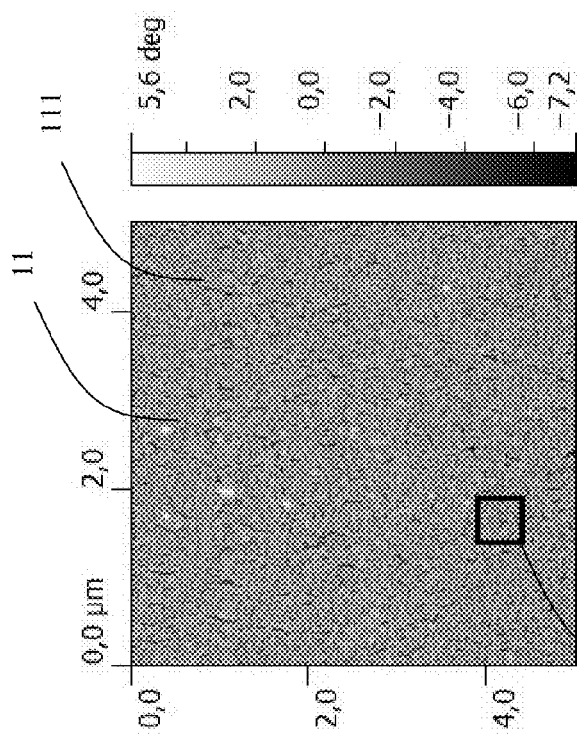
FIG. 11 shows an atomic force microscopy micrograph of an SBR functionalized with 7 percent by weight of PNIPAM.
Figure 11A:
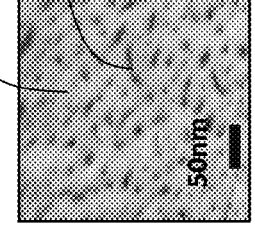
FIG. 11A shows a magnified region of the sample in FIG. 11.

FIGS. 11 and 11A show micrographs of Sample 6B (SBR functionalized with 7 percent by weight of 6700 MW PNIPAM). As compared with Sample 6A in FIGS. 10 and 10A, Sample 6B show many more, smaller regions 111 of PNIPAM indicating localized phase separation of bound PNIPAM in the continuous phase 11 of SBR.

Figures 12, 13, 14:
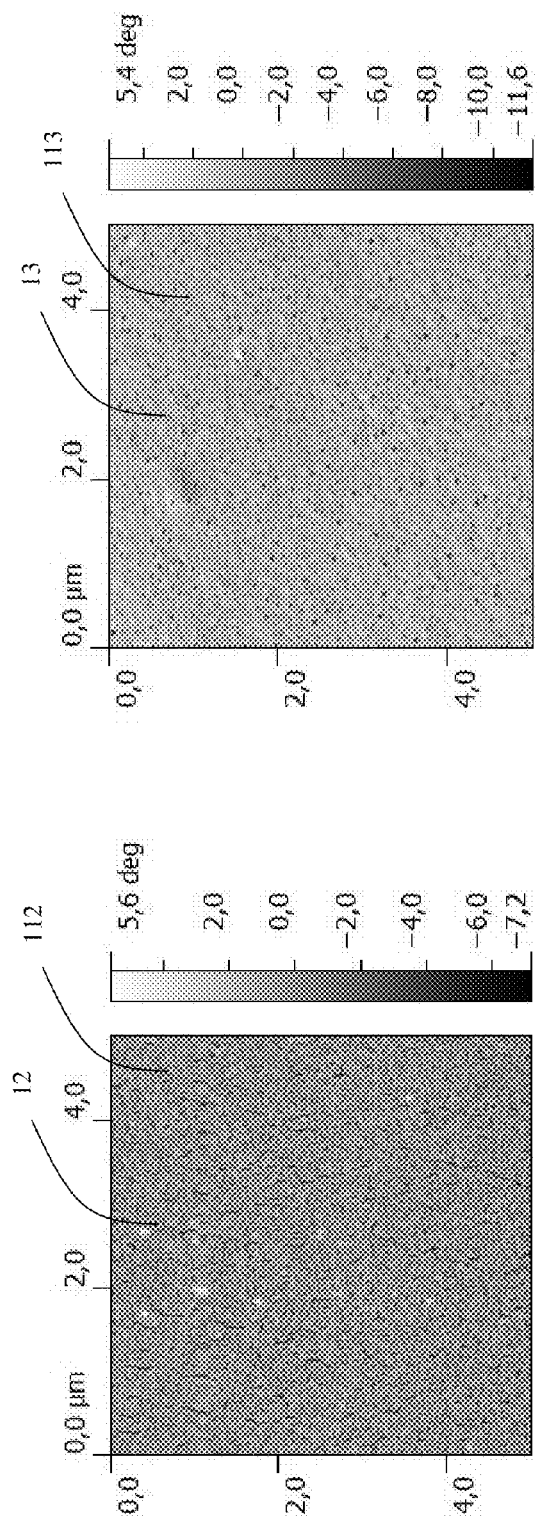
FIG. 12 shows the same micrograph as FIG. 11.
FIG. 13 shows an atomic force microscopy micrograph of a blend of a PNIPAM functionalized SBR and 3 percent by weight of a additional PNIPAM homopolymer.
FIG. 14 shows an atomic force microscopy micrograph of a blend of a PNIPAM functionalized SBR and 6 percent by weight of a additional PNIPAM homopolymer.

FIGS. 12-14 show the effect of adding additional PNIPAM homopolymer to a PNIPAM-functionalized SBR. FIG. 12 is identical to FIG. 11, showing a micrograph of Sample 6B (SBR functionalized with 7 percent by weight of 6700 MW PNIPAM). FIG. 13 shows a micrograph of Sample 6C (3 percent by weight of additional 6700 MW PNIPAM homopolymer added to SBR functionalized with 7 percent by weight of 6700 MW PNIPAM). FIG. 14 shows a micrograph of Sample 6D (6 percent by weight of additional 6700 MW PNIPAM homopolymer added to SBR functionalized with 7 percent by weight of 6700 MW PNIPAM). Comparison of the locally separated bound PNIPAM phases 113 in FIG. 13 and 114 in FIG. 14 with 112 of FIG. 12 shows that addition of sequentially greater amounts of additional PNIPAM homopolymer leads to sequentially greater swelling of the PNIPAM phases 113 and 114 in the SBR phases 13 and 14 due to selective migration of the additional PNIPAM homopolymer into the bound PNIPAM phases.

Similar behavior is seen for higher molecular weight PNIPAM. With reference now to FIG. 15, a micrograph of Sample 20A (2 percent by weight of additional, 20000 MW PNIPAM in SBR) is shown. As seen in FIG. 15, regions 115 are distinct and disperse phases of PNIPAM separated from the continuous phase 15 of SBR. FIG. 15A shows in greater magnification the separation of PINIPAM phases 115 from continuous SBR phase 15.

FIGS. 16 and 16A show micrographs of Sample 20B (SBR functionalized with 2 percent by weight of 20000 MW PNIPAM). As compared with Sample 20A in FIGS. 15 and 15A, Sample 20B show many more, smaller regions 116 of PNIPAM indicating localized phase separation of bound PNIPAM in the continuous phase 16 of SBR.

Figures 17, 18:
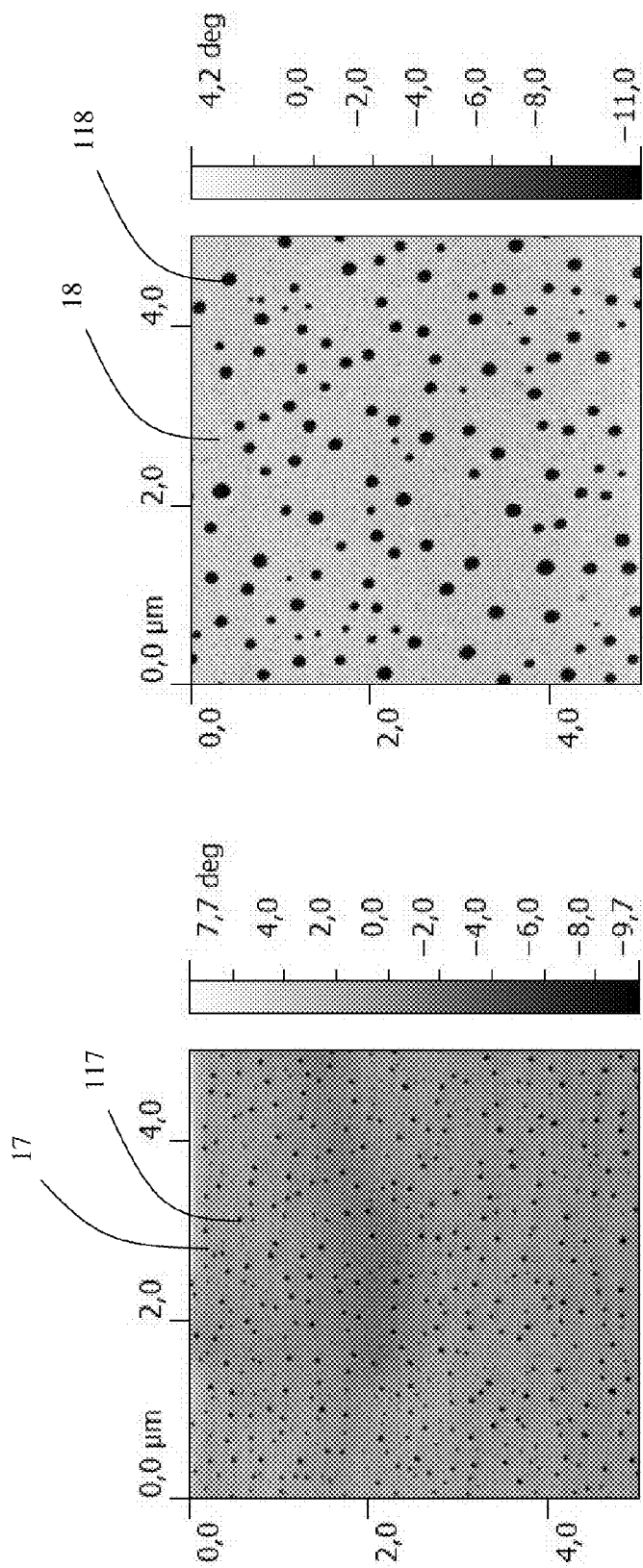
FIG. 17 shows the same micrograph as FIG. 16.
FIG. 18 shows an atomic force microscopy micrograph of a blend of a PNIPAM functionalized SBR and 5 percent by weight of a additional PNIPAM homopolymer.

FIGS. 17-18 show the effect of adding additional PNIPAM homopolymer to a PNIPAM-functionalized SBR. FIG. 17 is identical to FIG. 16, showing a micrograph of Sample 20B (SBR functionalized with 2 percent by weight of 20000 MW PNIPAM). FIG. 18 shows a micrograph of Sample 20C (5 percent by weight of additional 20000 MW PNIPAM homopolymer added to SBR functionalized with 2 percent by weight of 20000 MW PNIPAM). Comparison of the locally separated bound PNIPAM phases 118 in FIG. 18 with 117 of FIG. 17 shows that addition of sequentially greater amounts of additional PNIPAM homopolymer leads to sequentially greater swelling of the PNIPAM phases 118 in the SBR phases 18 due to selective migration of the additional PNIPAM homopolymer into the bound PNIPAM phases.

What is claimed is:

1. A polymer blend comprising a copolymer and an additional polymer, the copolymer comprising the structure

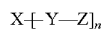

where X is a polymer derived from a monomer comprising at least one conjugated diene monomer selected from the group consisting of isoprene and butadiene and optionally styrene;

Z is a polymer capable of exhibiting a lower critical solution temperature (LCST);

Y is a divalent group bonded to both X and Z, wherein Y is sulfur; and n is the number of $-[-Y-Z]$ groups bonded to X;

the additional polymer consisting of a polymer miscible with Z;

wherein the polymer blend comprises from 1 to 20 weight percent of the additional polymer wherein the polymer blend is in the form of an article of manufacture selected from the group consisting of reinforced hoses, transmission belts, drive belts, air springs, conveyor belts, drive tracks, and shoe soles.

2. The polymer blend of claim 1, wherein X is selected from the group consisting of solution polymerized styrene-butadiene rubber, emulsion polymerized styrene-butadiene rubber, polybutadiene, natural polyisoprene rubber, and synthetic polyisoprene rubber.

3. The polymer blend of claim 1, wherein Z is derived from a monomer of formula

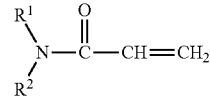

where $R^1$ and $R^2$ are independent selected from the group consisting of hydrogen, C2 to C6 linear alkyl, C2 to C6 branched alkyl, and C3 to C6 cycloalkyl, with the proviso that at least one of $R^1$ and $R^2$ is not hydrogen.

4. The polymer blend of claim 1, wherein Z is selected from the group consisting of poly(N-isopropylacrylamide), poly (N-cyclopropylacrylamide), and poly (N,N-diethylacrylamide).

5. The polymer blend of claim 1, wherein the additional polymer is derived from a monomer of formula

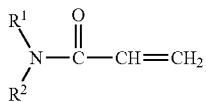

where $R^1$ and $R^2$ are independent selected from the group consisting of hydrogen, C2 to C6 linear alkyl, C2 to C6 branched alkyl, and C3 to C6 cycloalkyl, with the proviso that at least one of $R^1$ and $R^2$ is not hydrogen.

6. The polymer blend of claim 1, wherein the additional polymer is selected from the group consisting of poly(N-isopropylacrylamide), poly(N-cyclopropylacrylamide), and poly (N,N-diethylacrylamide).

7. The polymer blend of claim 1, wherein the additional polymer is selected from the group consisting of homopolymers and copolymers of: acrylamides, substituted acrylamides, methacrylamides, substituted methacrylamides, acrylic acids, substituted acrylic acids, methacrylic acids, substituted methacrylic acids, vinyl alkyl ethers, substituted vinyl alkyl ethers, vinyl caprolactams, substituted vinyl caprolactams, oligo(ethylene glycol) methacrylate and 2-(2-methoxyethoxy) ethyl methacrylate.

8. The polymer blend of claim 1, comprising from about 0.5 to about 20 weight percent Z.

9. The polymer blend of claim 1, wherein n ranges from about 1 to about 30.

10. The polymer blend of claim 1, wherein the vinyl aromatic monomer is styrene, the conjugated diene monomer is butadiene, Y is divalent sulfur, and Z is derived from N-isopropylacrylamide.

11. The polymer blend of claim 1, wherein the conjugated diene monomer is isoprene, Y is divalent sulfur, and Z is derived from N-isopropylacrylamide.

12. The polymer blend of claim 3, wherein the conjugated diene monomer is butadiene, Y is divalent sulfur, and Z is derived from N-isopropylacrylamide.

13. The polymer blend of claim 1, wherein Z is of formula

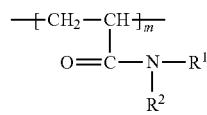

where $R^1$ and $R^2$ are independently selected from the group consisting of hydrogen, C2 to C6 linear alkyl, C2 to C6 branched alkyl, and C3 to C6 cycloalkyl, with the proviso that at least one of $R^1$ and $R^2$ is not hydrogen, and m is the degree of polymerization of the hydrocarbon chain.

14. The polymer blend of claim 1, wherein the blend comprises from 3 to 20 weight percent of the additional polymer.

15. The polymer blend of claim 1, wherein the blend comprises from 5 to 20 weight percent of the additional polymer.

* * * * *